Nov. 16, 1965 D. J. SUDA 3,218,395

ELECTRONIC SIGNALING ARRANGEMENT

Filed Sept. 17, 1962

INVENTOR.
Douglas J. Suda

BY C. A. Gulbrandsen

Atty.

3,218,395

ELECTRONIC SIGNALING ARRANGEMENT

Douglas J. Suda, Downers Grove, Ill., assignor to Automatic Electric Laboratories, Inc., Northlake, Ill., a corporation of Delaware Filed Sept. 17, 1962, Ser. No. 223,897
4 Claims. (Cl. 179—84)

The invention relates to signaling arrangements and in particular to signaling arrangements having an output of tone pulses.

Signaling arrangements having such an output are particularly useful in telephone signaling systems as a means of calling a subscriber's attention to an incoming call. I. P. Kaminow, in his U.S. Patent 2,836,724, teaches the use of a self-quenching oscillator for producing pulses of oscillation for identifying a point of failure in a faulty pair of conductors in a cable. Such an oscillator requires additional reactive components to perform the self-quenching operation. The present invention produces pulses of oscillations without using additional reactive components.

It is the object of my invention to provide a novel and improved signaling arrangement.

According to a feature of the invention, provision is made to modulate a generator of oscillations so that the output comprises pulses of oscillation.

According to another feature of the invention, response to dial pulses is minimized.

Other objects and features will become apparent and the invention will be best understood by consideration of the following description and the accompanying drawings.

Briefly, my signaling arrangement utilizes a transistor oscillator. A PNP transistor 10 has been shown in FIG. 2, however, an NPN transistor may be used if the proper polarity changes are made. The transistor 10 is powered by direct current that is derived from the rectifier bridge circuit R and the output of transistor 10 is connected to a tuned circuit T of which sound transducer 16 may advantageously be a telephone receiver.

So that the operation of the signaling arrangement will be more easily understood, I will first present a detailed description of my invention.

Figure 1:
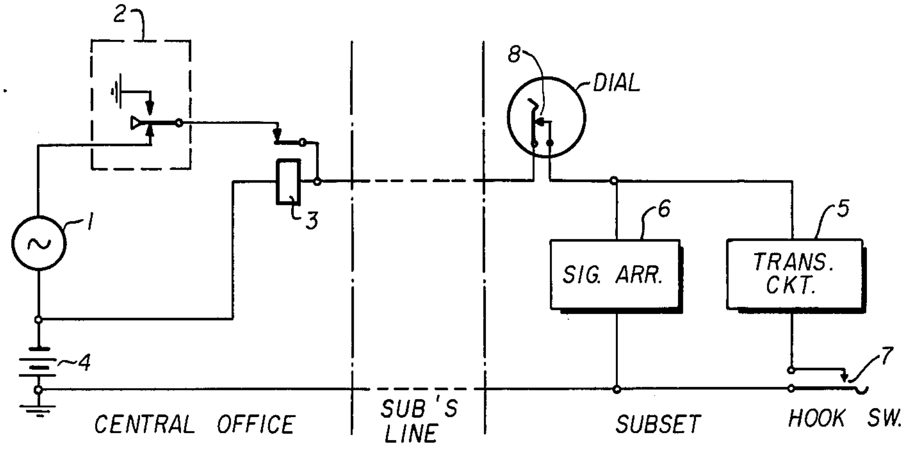
FIG. 1 is a schematic representation of a conventional telephone signaling system.

First referring to FIG. 1, a central office having a ringing current generator 1, ringing current interrupter apparatus 2, a ring trip relay 3, and a source of direct current 4 is connected to a subscriber line by the central office switching equipment (not shown). A subscriber subset having a transmission circuit 5, dial contacts 8 and a signaling arrangement 6 is connected to the subscriber line. The subset hookswitch 7 is used to control the ring trip relay 3 in the usual manner.

Figure 2:
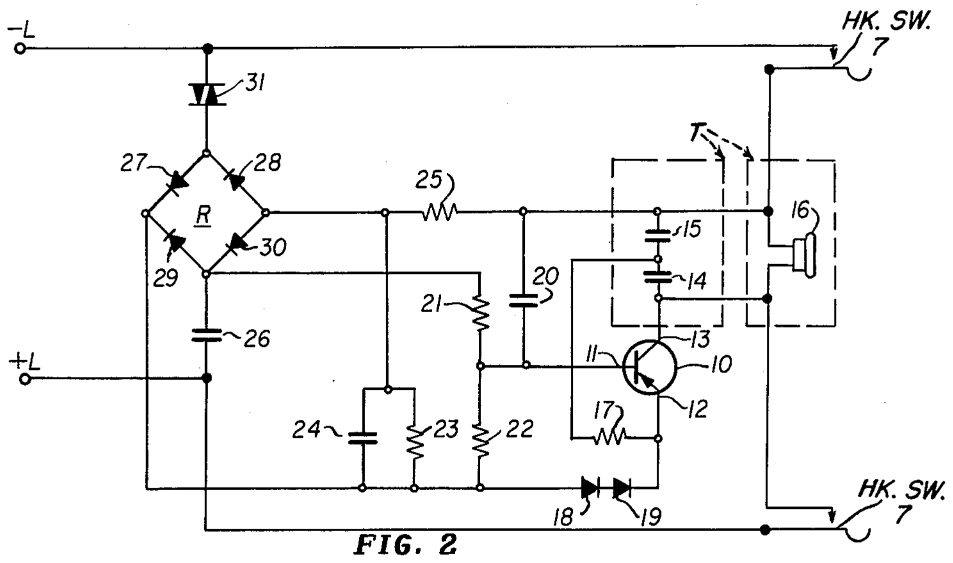
FIG. 2 is a circuit diagram of an embodiment of my signaling arrangement.

Referring now to FIG. 2, a PNP transistor 10 having a base electrode 11, and emitter electrode 12 and a collector electrode 13 is used as the active element of the arrangement. A tuned circuit T having elements 14, 15 and 16 is connected to the collector electrode 13. A feedback path for the oscillator exists from a point between capacitances 13 and 14 via resistance 17 to the emitter electrode 12 of transistor 10. The capacitance 20 acts as a bypass element between the tuned circuit T and base electrode 11 providing a negative alternating current potential to the base 11, while resistance 17 provides a positive alternating current potential of the emitter 12. Resistance 25 limits the current drain and hence the power consumption of the arrangement. Resistances 21 and 22 connected between the rectifier circuit R and the emitter electrode 12 by control lead C and diodes 18 and 19, form a voltage divider circuit from which the operating base-emitter operating bias is derived. Capacitance 24 is connected across the output of the rectifier bridge R to minimize the response to dial pulses. Resistance 23 is also connected across the output terminals of the rectifier bridge R to provide a leak discharge path for capacitance 23 and to prohibit capacitance 23 from charging to a high value. For example, if the signaling arrangement is subjected to a series of high value digit signals, say three nine digits in succession, the capacitance 23 would have a tendency to obtain a high charge. However resistance 24 supplies a leak discharge path between pulses and between digits. Capacitance 23 acts to filter the output of the rectifier bridge R. The diodes 27–30 rectify the incoming ringing signal always keeping its output connections at the same polarity. A non-linear resistance element 31, which may advantageously be a varistor, is serially connected between input terminal —L and an input connection to the rectifier circuit R, as will be explained below. Capacitance 26 is serially connected between the other input terminal +L and the other input connection to the rectifier circuit R to prevent direct line current from operating the arrangement.

Referring to FIG. 2, assume that ringing current is being supplied to the terminals +L and —L in a manner such as suggested by FIG. 1. The ringing current is rectified by the rectifier bridge R which always provides the same polarity, as shown by the + and — signs at its output terminals in FIG. 2. Positive potential is provided to the emitter electrode 12 from the rectifier bridge R by way of diodes 18 and 19. Negative potential is supplied from rectifier bridge R by way of resistance 25 and the inductor 16 to the collector electrode 13.

Now considering the control lead C and the voltage divider circuits 21 and 22, it can be seen that each negative half-cycle of ringing current that is impressed at the +L terminal will also be impressed on the control lead C. Assuming no voltage drop for diodes 29, 18 and 19, the full potential is supplied to the emitter electrode 12. Only a portion of that potential is supplied to the base electrode 11 by way of control lead C and the voltage divider circuits 21 and 22. The operating bias, thus derived from this difference of potential enables transistor 10 and the tuned circuit T starts to oscillate at the design frequency, say 2900 c.p.s. For ecah positive half-cycle of the ringing current impressed on the control lead C, the base-emitter junction of transistor 10 is reverse biased and unable to conduct. In the above manner the oscillator is pulsed into conduction at a rate equal to one-half of the ringing current frequency. It can be seen that forward base-emitter bias occurs on each negative half-cycle of the ringing current. It can also be seen that the output oscillations will occur as pulses of frequency corresponding to the forward bias time of the base-emitter junction of transistor 10. It is to be understood that the electro-acoustic transducer 16 will emit audible tone pulses according to the ringing frequency and pattern.

The non-linear resistance element 31 is connected in series with the input to prevent high bridging losses when the arrangement is connected to a subscriber line during a conversation. A particular varistor that was used for this purpose gave the arrangement an input impedance of approximately 20 megohms at voice levels and an input impedance similar to that of conventional electromechanical ringers at ringing voltage levels.

The combination of capacitance 24 absorbing the dial pulses and of diodes 18 and 19 effecting a time delay in the transistor response achieves a minimum response to dial pulses.

If, as previously stated, the sound transducer is the same receiver capsule that is used in the transmission circuit, it will act as a microphone as well as a speaker. It is important that the circuit be arranged to prevent room conversation that is picked up by the transducer from being transmitted onto the subscriber line. Such a situation would allow unauthorized listening by way of a high gain amplifier. Capacitance 24 and capacitances 14 and 15 effectively short audio frequencies thereby isolating such conversation from the line.

The embodiment shown in FIG. 2 will respond to any conventional ringing frequency. The ringing tone will change sound with different ringing frequencies. The more desirable frequencies are those in the range from 16⅔ to 33⅓ c.p.s.

Modifications of my signaling arrangement may be made by those skilled in the art without departing from the spirit and scope of the invention and should be included in the appended claims.

What I claim is:

1. In a telephone system including a central office having a source of alternating signaling current, a subscriber line, and a tone signal generator connected to said line, said tone signal generator comprising: an oscillator having an input circuit and an output circuit, said output circuit including a sound transducer; bridge rectifier means for supplying said oscillator with direct current operating potentials, said rectifier having a plurality of input terminals and a plurality of output terminals; and means including an alternating current voltage dividing circuit interposed between one of said rectifier input terminals and said input circuit of said oscillator for deriving an operating bias for said oscillator during alternate half cycles of said alternating current.

2. In a telephone system, the combination as claimed in claim 1, wherein said system further includes dial pulse generation means connected to said line, and wherein said tone signal generator further comprises dial pulse suppression means including a capacitance connected in shunt relation with said output terminals of said rectifier means.

3. In a telephone system, the combination as claimed in claim 2, wherein said oscillator further includes a transistor having a base, an emitter and a collector, and wherein said dial pulse suppression means further includes at least one diode serially connected between one of said output terminals of said rectifier means and said emitter.

4. In a telephone system, the combination as claimed in claim 3, and further including a transmission circuit having a sound transducer, switching means for alternately connecting said transmission circuit and said tone signal generator to said subscriber line, and wherein said oscillator further comprises a tuned circuit including a plurality of capacitances and said sound transducer of said transmission circuit connected between said collector and another of said output terminals of said rectifier means, said sound transducer being of the type capable of acting as a microphone, whereby said plurality of capacitances and said dial pulse suppression capacitance co-act to prevent signals resulting from said microphone action of said sound transducer from being coupled to said subscriber line.

References Cited by the Examiner

UNITED STATES PATENTS

| | | | |
|---|---|---|---|
| 2,957,950 | 10/1960 | Holman et al. | 179—84 |
| 3,005,053 | 10/1961 | Schmidt | 179—84 |
| 3,036,159 | 5/1962 | Collins | 179—17 |

ROBERT H. ROSE, *Primary Examiner.*

WALTER L. LYNDE, *Examiner.*